United States Patent
Beckers et al.

(10) Patent No.: US 12,499,500 B2
(45) Date of Patent: Dec. 16, 2025

(54) VERIFICATION METHOD FOR AN OXYGEN REDUCTION SYSTEM

(71) Applicant: Wagner Group GmbH, Langenhagen (DE)

(72) Inventors: Stefan Beckers, Ilsede (DE); Andreas Henkel, Harsum (DE)

(73) Assignee: Wagner Group GmbH (DE)

( * ) Notice: Subject to any disclaimer, the term of this patent is extended or adjusted under 35 U.S.C. 154(b) by 998 days.

(21) Appl. No.: 17/621,940

(22) PCT Filed: Jun. 23, 2020

(86) PCT No.: PCT/EP2020/067433
§ 371 (c)(1),
(2) Date: Jun. 22, 2022

(87) PCT Pub. No.: WO2021/001206
PCT Pub. Date: Jan. 7, 2021

(65) Prior Publication Data
US 2022/0343447 A1  Oct. 27, 2022

(30) Foreign Application Priority Data

Jul. 1, 2019  (DE) ..................... 10 2019 117 651.4
Jul. 15, 2019  (EP) ..................... 19186341

(51) Int. Cl.
*G06Q 50/26*  (2024.01)
*G01N 33/00*  (2006.01)

(52) U.S. Cl.
CPC ......... *G06Q 50/26* (2013.01); *G01N 33/0018* (2013.01)

(58) Field of Classification Search
None
See application file for complete search history.

(56) References Cited

U.S. PATENT DOCUMENTS 7,231,808 B2 * 6/2007 Wagner .............. G01N 33/0063
169/44
8,517,116 B2 * 8/2013 Wagner .............. A62C 99/0009
169/45
(Continued)

FOREIGN PATENT DOCUMENTS

CN  101605573 A * 12/2009 ............. A62C 3/004
DE  19811851 A * 9/1999 ......... A62C 99/0018
WO  WO-2005044387 A * 5/2005 ............. A62C 35/15

*Primary Examiner* — Daniel S Larkin
(74) *Attorney, Agent, or Firm* — Frank H. Foster; Kremblas & Foster

(57) ABSTRACT

A method for verifying system functions of an oxygen reduction system, said functions being used during operation. The oxygen reduction system reduces or maintains an oxygen concentration level in a protection region by supplying inert gas and to monitor or increase the oxygen concentration level, which has been previously reduced in the protection region or in a monitoring region. The method comprises:

Detecting system functions being used during the operation of the oxygen reduction system.

generating a license data set which contains licenses used by the system functions being used.

reading a verification data set provided on a storage medium, wherein the verification data set contains at least one existing license— determining a license violation if each license used is not contained in the verification data set.

outputting an error message, or deactivating at least one system function if a license violation is determined.

17 Claims, 6 Drawing Sheets

(56) References Cited

U.S. PATENT DOCUMENTS

| | | | |
|---|---|---|---|
| 9,079,054 B2* | 7/2015 | Claessen | A62C 35/68 |
| 9,861,842 B2* | 1/2018 | Wagner | A62C 99/0018 |
| 2002/0040940 A1* | 4/2002 | Wagner | A62C 99/0018 239/208 |
| 2008/0135265 A1 | 6/2008 | Wagner et al. | |
| 2013/0179984 A1 | 7/2013 | Kumar et al. | |
| 2017/0161470 A1 | 6/2017 | Feng | |
| 2017/0173373 A1* | 6/2017 | Wagner | A62C 99/0018 |

* cited by examiner

Figure 5

| I | z | L |
|---|---|---|
| $I_{1y}$ | $z_1 = x_{L1} - y_{l1}$ | $L_{1x}$ |
| $I_{2y}$ | $z_2 = x_{L2} - y_{l2}$ | $L_{2x}$ |
| ... | ... | ... |
| $I_{ny}$ | $z_n = x_{Ln} - y_{ln}$ | $L_{nx}$ |

| $y_{ln}$ | $I_{n1}$ | $I_{n2}$ | ... | $I_{nm}$ |
|---|---|---|---|---|
| $y_{l1} = y_{l11} + y_{l12} + ... + y_{l1m}$ | $I_{11y}$ | $I_{12y}$ | ... | $I_{1my}$ |
| $y_{l2} = y_{l21} + y_{l22} + ... + y_{l2m}$ | $I_{21y}$ | $I_{22y}$ | ... | $I_{2my}$ |
| ... | ... | ... | ... | ... |
| $y_{ln} = y_{ln1} + y_{ln2} + ... + y_{lnm}$ | $I_{n1y}$ | $I_{n2y}$ | ... | $I_{nmy}$ |

Figure 7

| sl | $z_{SL}$ | SL |
|---|---|---|
| $sl_{By}$ | $z_{SLB} = x_{SLB} - y_{slB}$ | $SL_{Bx}$ |
| $sl_{Py}$ | $z_{SL} = x_{SLP} - y_{slP}$ | $SL_{Px}$ |
| $sl_{My}$ | $z_{SL} = x_{SLM} - y_{slM}$ | $SL_{Mx}$ |

|   |     | 210 | | 220 |
|---|-----|-----|---|-----|
| n | 110 | y | z | x |
| 6 | Region Control Module (Standard Functions) | 3 | 0 | 3 |
| 9 | Air Circulation | 1 | 0 | 1 |
| 13 | Monitoring of Access Doors | 0 | 1 | 1 |
| 22 | Process Control Module (Standard Functions) | 2 | 0 | 2 |

|   |     | 210 | | 220 |
|---|-----|-----|---|-----|
| n | 110 | y | z | x |
| 6 | Region Control Module (Standard Functions) | 3 | 0 | 3 |
| 9 | Air Circulation | 2 | -1 | 1 |
| 13 | Monitoring of Access Doors | 0 | 1 | 1 |
| 22 | Process Control Module (Standard Functions) | 2 | 0 | 2 |

250

VERIFICATION METHOD FOR AN OXYGEN REDUCTION SYSTEM

BACKGROUND OF THE INVENTION

The invention relates to a verification method for verifying system functions of an oxygen reduction system, said functions being used during the operation of the oxygen reduction system, wherein the oxygen reduction system is designed to reduce and/or maintain an oxygen concentration level in at least one protection region by supplying inert gas originating from at least one inert gas source and to monitor or increase the oxygen concentration level, which has been previously reduced in particular, in the protection region or in a monitoring region.

The invention also relates to a programmable control module and an oxygen reduction system with such a programmable control module.

In practice, oxygen reduction systems are often used to prevent and avoid fires. These systems make it possible to reduce the oxygen content within a protection region to a level that is below the oxygen content in the ambient air and, in particular, below the ignition limit of materials present in the protection region. A protection region is generally understood to be a spatially delimited or enclosed region in which the oxygen concentration is reduced to prevent fire and regulated within a predetermined range of values. The oxygen concentration is lowered by supplying inert gases or air enriched with inert gas, in particular nitrogen or nitrogen-enriched air, to the protection region. In this way, the ratio between inert gas or air enriched with inert gas and oxygen is set such that, as a result, the oxygen content of the air contained in the protection region is reduced. Sufficient oxygen preferably remains available so that people can stay in the protection region. In addition to the protection region, monitoring of the oxygen concentration is often also required in a so-called monitoring region. A monitoring region can be a spatially delimited or enclosed region, in particular in rooms accessible to service personnel of the oxygen reduction system or other people, which rooms are adjacent, e.g., a protection region. Although no inert gas introduction is provided per se in a monitoring region, an introduction of inert gases could occur unintentionally, in particular through leaks in the pipe system. If the oxygen concentration level is too low in a protection region or a monitoring region due to the intentional (protection region) or unintentional (monitoring region) introduction of inert gas, the oxygen concentration can also be increased by means of the oxygen reduction system.

Usually, a control center is provided to regulate the individual components of the oxygen reduction system, which control system regulates, e.g., on the one hand, the generation of inert gas according to the requirements and, on the other hand, is connected to oxygen concentration sensors in order to pass on the corresponding inert gas quantity requirements to the inert gas sources, in particular inert gas generators. In addition to the usual, stationary inert gas generators, such as, e.g., a membrane nitrogen generator or a pressure swing adsorption nitrogen generator, in particular mobile inert gas generators and mobile tank trucks or stationary inert gas tanks in the form of larger containers or inert gas cylinders or cylinder batteries are possible as inert gas sources. In addition, the control center is coupled to several actuators in order to control distribution of the inert gas generated. The control center can regulate several protection regions separately from one another, with one or more inert gas sources, in particular inert gas generators, being assigned to each protection region and each protection region being equipped with one or more oxygen concentration sensors.

A decentralized control and regulation system of such an oxygen reduction system is known from the older PCT/EP2019/061910, which has several signal-connected controller modules for performing control functions, the control functions being distributed decentrally to the controller modules. According to PCT/EP2019/061910, the terms "controller module" and "control function" are to be understood as short forms for the terms "control and regulation module" and "control and regulation function." Standardized controller modules that are largely identical in terms of hardware are used to which different functions can be assigned for operating the oxygen reduction system. The control and/or regulation of the inert gas generation can be assigned to a controller module as a process controller, the monitoring of an oxygen concentration level in a protection region or monitoring region can be assigned to a further controller module as a section controller, and finally a communicative coordination between the other controller modules can be assigned to a controller module as a master controller. The controller modules are connected to one another via a bus system and are available even in the basic configuration of the control and regulation system and configured to perform basic core or basic functions that are absolutely necessary for the operation of the oxygen reduction system. To carry out further, optional control functions, the controller modules can be expanded to include additional assemblies and/or plug-in cards. The disadvantage here, however, is that the control and regulation system as well as the functions in the operation of the oxygen reduction system can also be expanded after delivery, installation, and commissioning without an examination or approval with regard to safety-relevant aspects being necessary for technical reasons. For example, non-approved assemblies and/or plug-in cards could be used.

It is also known to design such controller modules as a programmable logic controller (PLC). A programmable logic controller has several inputs and outputs, also referred to as input channels or output channels, which are connected to sensors and actuators of the system. A user program is loaded via an interface which, among other things, defines how the outputs are to be switched depending on the inputs and thus controls and/or regulates the system via the connected sensors and actuators.

In the field of computer software, it is customary to equip software that is subject to a license with copy protection. A copy protection plugs, a so-called dongle, is supplied with the software, for example, which is plugged into an interface of the computer, for example a USB port. During use, the protected software checks whether the copy protection plug is present; if this is not the case, for example, only restricted program functions can be enabled or use of the software can be denied. Other forms of hardware dongles are, in particular, the use of public-private key encryption methods, in which the encrypted dongle information can be stored in the computer's flash ROM. Network variants of dongle copy protection are also known.

The object of the present invention is to improve safety when operating an oxygen reduction system, in particular to provide a method to check system functions used in the operation of an oxygen reduction system and to ensure that only approved or released system functions are used.

SUMMARY OF THE INVENTION

The object is achieved by means of a verification method by means of a programmable control module, and by means of an oxygen reduction system.

A verification method according to the invention for an oxygen reduction system of the type described at the beginning has the following method steps:

- detecting system functions used during the operation of an oxygen reduction system;
- generating a license data set, said license data set containing licenses ($I_{1y}, I_{2y}, \ldots, I_{ny}$) used by the system functions being used;
- reading a verification data set provided on a storage medium, said verification data set containing at least one existing license ($L_{1x}, L_{2x} \ldots L_{nx}$);
- determining a license violation if each license ($I_{1y}, I_{2y}, \ldots, I_{ny}$) used is not contained in the verification data set;
- outputting a notification, in particular an error notification, and/or deactivating at least one system function, particularly all system functions, if a license violation is determined.

According to the invention, the verification method is thus carried out during operation of the oxygen reduction system, i.e., while the oxygen reduction system is using the system functions required for the operation thereof, and is running in the background, while the system functions used are controlled and regulated by a control and regulation system at the same time. In principle, the system functions of the oxygen reduction system are divided into basic system functions that are absolutely necessary for functionality and optional system functions that can be used in addition to the basic system functions as needed. In particular, basic system functions are the generation of an amount of inert gas required to lower and/or maintain the oxygen concentration in a protection region, the release of the generated amount of inert gas into the corresponding protection region, and also the monitoring of the protection region, or an increase in an oxygen concentration that was previously lowered in the protection region. Optional system functions are, for example, the distribution of the generated inert gas in several protection regions, the purely precautionary monitoring of the oxygen concentration in monitoring regions such as neighboring, technical, equipment, and operating rooms, monitoring of ambient conditions, air circulation in protection regions and monitoring regions, etc.

In a, particularly first, method step of the verification method according to the invention, system functions used during operation and at the current point in time are detected. It has been shown to be advantageous to detect all system functions used, but it is also possible, for example, to only detect the optional system functions.

In a second method step, which in particular follows the first method step, a license data set is generated. The license data set contains licenses used by the system functions being used. To this end, a further distinction can be made between system functions that require a license and license-free system functions. As a rule, basic system functions are license-free or combined in a basic license; optional system functions are usually subject to a license. All system functions used are preferably detected, but alternatively it is also conceivable to detect only the optional system functions. In an advantageous embodiment, the license data set is generated on the basis of all the system functions used by the oxygen reduction system and contains the licenses used for all system functions that require a license.

In a third method step, which in particular follows the second method step or is carried out simultaneously with the first or the second method step, a data set, a verification data set, is read by a storage medium. The verification data set contains one or more existing licenses, which are preferably also assigned to a specific system function or, in particular in the form of a basic license, to several (basic) system functions.

In a fourth method step, which in particular follows the third method step, it is determined whether a license violation has occurred. To this end, the license data set and the verification data set are compared with each other in that a check is carried out to determine whether the respective licenses, which are assigned to the system functions, are included in the verification data set, i.e., in particular whether a corresponding, existing license of the verification data set can be assigned to each license used of the data set. If at least one license used is not included in the verification data set, i.e., in particular no corresponding, existing license can be assigned to at least one license used, a license violation is determined.

In a fifth method step, which in particular follows the fourth method step, a message, in particular an error message, is finally output if a license violation is detected. A message can in principle be any type of message issued in the verification method, on the basis of which message a license violation can be detected by a user or service personnel. As a rule, an error message is stored internally in the system and can only be recognized by querying the relevant parameters. A fault message, however, is a special error message that is issued for the purposes of making a user, in particular service personnel, actively aware of the existence of a license violation, e.g., also through optical or acoustic signals. When a message is output, in particular an error message or fault message, it is generally provided that the oxygen reduction system continues its normal operation without interfering with or impairing the system function being used.

Additionally or alternatively, if a license violation is determined, at least one function, in particular a function that requires a license, or all of the system functions being used can be deactivated.

If a license violation is not determined, normal operation of the oxygen reduction system will also be continued and the system functions currently in use will continue to be carried out.

The verification method can be carried out once, e.g., to release the oxygen reduction system after installation and during commissioning, or it can be repeated at specific or regular time intervals in order to check and/or verify a dynamic expansion of the system functions during operation and after commissioning.

Advantageous embodiments are claimed in the dependent claims and explained in more detail below.

To connect to the oxygen reduction system, the verification method is implemented, in an advantageous embodiment, on at least one programmable control module (also referred to as "controller" or "controller module" in technical circles), in which the system functions used are detected based on a specific assignment of signal input and output channels of the at least one control module.

The verification method is preferably implemented in a programmable control module which is also configured for the control and regulation of the oxygen reduction system. The programmable control module can, for example, be a programmable logic controller whose input and output channels for controlling and regulating the oxygen reduction system are assigned corresponding system functions, i.e., are connected to the sensors and actuators required to carry out these system functions. The verification method can, in particular, be stored in a memory core of the control module in the form of programming, in which the system functions used can be detected on the basis of the assignment of the input and output channels. A particular advantage here is that the verification method can also be easily retrofitted into a control and regulation system of an oxygen reduction system that is already in operation.

In an advantageous embodiment of the verification method according to the invention, each license ($I_{1y}$, $I_{2y}$, ..., $I_{ny}$) used of the license data set comprises at least two parameters: a respective license type (1, 2, ..., n) and a first number of licenses ($y_{l1}$, $y_{l2}$, ... $y_{ln}$) assigned to the respective license type (1, 2, ..., n); and each existing license ($L_{1x}$, $L_{2x}$ ... $L_{nx}$) of the verification data set comprises at least two parameters: a respective license type (1, 2, ..., n) and a second number of licenses ($x_{L1}$, $x_{L2}$, $x_{Ln}$) assigned to the respective license type (1, 2, n), with the variables y=0, 1, n for the first number of licenses and x=0, 1, n for the second number of licenses. In order to determine a license violation, the licenses being used ($I_{1y}$, $I_{2y}$, ..., $I_{ny}$) are assigned to the existing licenses ($L_{1x}$, $L_{2x}$ ... $L_{nx}$), in particular in a matrix-like manner, i.e. in rows or columns.

The licenses assigned to specific system functions are differentiated as license types. For example, an "air circulation" license type can be assigned to the particularly optional air circulation system functions, whereas a "basic license" license type can be assigned to several basic system functions that are absolutely necessary for operating the oxygen reduction system, such as, e.g., generating an amount of inert gas required to lower and/or maintain the oxygen concentration in a protection region, releasing the generated amount of inert gas into the corresponding protection region, and/or increasing the oxygen concentration previously lowered in the protection region.

In a refinement of this embodiment, in order to determine a license violation, at least one license value ($z_1$, $z_2$, ..., $z_n$), with the variables z=-n, ..., -1, 0, 1, ..., n, is determined for mutually assigned license types (1, 2, ..., n), particularly in rows or columns, in that the first number of licenses ($y_{l1}$, $y_{l2}$, ... $y_{ln}$) of the licenses ($I_{1y}$, $I_{2y}$, ..., $I_{ny}$) used is subtracted from the second number of licenses ($x_{L1}$, $x_{L2}$, ... $x_{Ln}$) of the existing licenses ($L_{1x}$, $L_{2x}$ ... $L_{nx}$), and in which a license violation is determined if one of the determined license values ($z_1$, $z_2$, ..., $z_n$) is <0.

As an advantageous option, the determined license values ($z_1$, $z_2$, ..., $z_n$) can be output to a user or to service personnel, e.g., in the form of an optical display on a control and display panel or a monitor. Based on the determined license values ($z_1$, $z_2$, $z_n$)>0, the respective number of currently available licenses can be determined and the user or the service personnel are informed of freely available, i.e., unused but available, licenses. In this way, existing licenses for assigned system functions can be managed clearly and efficiently. A license value z=0 indicates that all existing licenses are being used by corresponding system functions or that all licenses being used are verified by the verification data set. Of course, it is also conceivable, in a reverse situation, to subtract the second number of licenses ($x_{L1}$, $x_{L2}$, ... $x_{Ln}$) of the existing licenses ($L_{1x}$, $L_{2x}$ ... $L_{nx}$) from the first number of licenses ($y_{l1}$, $y_{l2}$, ... $y_{ln}$) of the licenses ($I_{1y}$, $I_{2y}$, $I_{ny}$) used, in which a license violation is determined accordingly if one of the license values ($z_1$, $z_2$, $z_n$) determined in this way is >0.

According to an optional variant of the method, a check is carried out to determine whether the verification data set contains an activation code, in which a message, in particular a fault message, is output and/or at least one system function, preferably all system functions, are deactivated if the activation code is not recognized.

With the activation code, an additional and possibly higher-level security query can be provided, which can be carried out in particular before, during, or after read-in of the verification data set and thus it is ensured, e.g., that the storage medium contains the correct verification data set provided for the associated oxygen reduction system.

A similar security query can be carried out in a preferred embodiment through read-in of the verification data set via an interface connected or connectable to the storage medium in a signal-transmitting manner, in which a message, in particular a fault message, is output and/or at least one system function or preferably all system functions are deactivated in the event the signal-transmitting connection between the storage medium and the interface is not detected.

Even if it is basically conceivable that the interface is integrated internally in the programmable control module and the memory module, e.g., is designed as an internal memory core, it is advantageous according to a refinement of the above method variant to design the interface as an external interface, in particular as a USB port, and to design the memory module as an external memory module, in particular as a USB dongle, in which the external memory module can then be manually connected to the external interface by a user.

According to one embodiment of the invention, the verification method is preferably repeated at specific or regular time intervals, and a timer is started at the time the message, in particular the error message, is output in order to detect the period of time during which the message, in particular the error message, is output. To this end, the timer can be configured to measure the time period forwards or backwards.

If a license violation is no longer detected when the verification method is repeated, automatic resetting of the timer and the error or fault message is preferably provided. Alternatively or additionally, it is also conceivable that the timer and the error or fault message can be reset manually by a user or the service personnel of the oxygen reduction system.

In a further development of this embodiment of the invention, a fault message is output and/or at least one system function or particularly all system functions are deactivated when a predetermined period of time is reached or after the expiry of a predetermined period of time during which the message, in particular the error message, is output.

According to a particularly advantageous further development of this embodiment of the invention, at least one system function or particularly all system functions of the oxygen reduction system can be deactivated upon or after a predetermined period of time is reached, during which the message, in particular an error message and/or a fault message, is output.

Specifically, for example, a fault message can be output instead of the error message when a first predetermined period has been reached or after it has expired, after 60 minutes, during which an error message was output without interruption, or a license violation was detected without interruption. At least one system function, preferably all system functions, can then be deactivated when a second predetermined period has been reached or after a second specified period, e.g., after a further 72 hours, during which the error message was output without interruption, or a license violation was detected without interruption.

The specified time periods have proven to be advantageous for operating and operation of the oxygen reduction system. One the one hand, for example, within the first specified period of 60 minutes, the storage medium containing the verification data set can be temporarily removed for exchanging or installing updates and/or additional, existing licenses can be temporarily removed without interfering with the operation of the oxygen reduction system. On the other hand, the 72 hours specified with the second period of time provide sufficient time to remedy any unintentional license violation and/or to make the necessary preparations in the event of an imminent shutdown of selected or all system functions in order to prevent any possible risk caused by system functions no longer being used.

A variant of the method is particularly useful in which the verification method is implemented on several programmable and signal-linked control modules, in which at least one control module is provided as a region control module, which is assigned to at least one protection region or monitoring region, and/or at least one control module is provided as a process control module, which is assigned to at least one inert gas source, in particular an inert gas generator, and/or at least one control module is provided as a master control module. It is also conceivable to provide two or more master control modules to obtain a corresponding redundancy.

Especially for retrofitting a decentralized control and regulation system of an oxygen reduction system described above, it is advantageous to also implement the verification method according to the invention decentrally on several programmable control modules, which are signal-connected to one another via a bus system or ring bus system or even a (wireless) network, preferably on a respective memory core. It is advantageous if the several programmable control modules are constructed largely identically but are assigned to specific system parts of the oxygen reduction system, in particular also locally, and configured to control and regulate the system functions used locally. For example, at least one region control module can be assigned to one or more protection regions and/or monitoring regions and configured, among other things, to monitor and regulate the oxygen concentration therein, at least one process control module can be assigned to one or more inert gas sources, in particular to one or more inert gas generators, and configured to control the quantities of inert gas generated, and at least one master control module can be configured for communicative coordination of the other control modules.

In order to detect all locally used system functions, it has proven to be advantageous in one refinement that the detection of system functions being used, in particular locally, is implemented on the at least one region control module and/or on the at least one process control module and/or on the at least one master control module, in which system functions locally assigned to the respective control module can be detected on the basis of a specific assignment of signal input and signal output channels of the respective region control module and/or process control module and/or master control module.

It is also advantageous when the generation of the license data set is implemented locally on the respective control module. The method is therefore preferably characterized by the local generation of at least one license data set which contains licenses ($I_{1y}$, $I_{2y}$, . . . , $I_{ny}$) used by the respective control module, in which each license ($I_{1y}$, $I_{2y}$, . . . , $I_{ny}$) used there is assigned to at least one locally used system function and comprises at least two parameters: a respective license type (1, 2, . . . , n) and a first number of licenses ($y_{l1}$, $y_{l2}$, . . . $y_{ln}$) assigned to the respective license type (1, 2, . . . , n), with the respective variables y=1, 2, . . . , n.

In particular when configuring a control module as a master control module for monitoring communication, it has been found to be advantageous when the generation of a global license data set is implemented on the at least one master control module, and the global license data set is formed by combining the locally generated license data sets in that the first number of licenses ($y_{l1}$, $y_{l2}$, . . . $y_{ln}$) of the licenses ($I_{1y}$, $I_{2y}$, . . . , $I_{ny}$) used locally by the respective control modules is added to mutually assigned license types (1, 2, . . . , n) and in which an origin indicator (1, 2, . . . , m) corresponding to the respective control module is assigned to the licenses ($I_{11y}$, $I_{22y}$ . . . , $I_{nmy}$) used locally by the respective control modules, with the respective variables y=1, 2, . . . , n.

The global license data set therefore not only contains the information about the total number of licenses used for the respective license types, but it also contains the respective origin of the license used, i.e., which programmable control module is using these licenses.

When implementing the verification method on several control modules, it is useful according to the embodiment when the read-in of the verification data set and preferably also the determination of a license violation, in particular based on the global license data set, are implemented on the at least one master control module.

A further, additional security query can be provided according to a method variant in that the verification data set contains at least one existing control module license ($SL_{Bx}$, $SL_{Px}$, $SL_{Mx}$) and the license data set contains control module licenses ($sI_{By}$, $sI_{Py}$, $sI_{My}$) used by the respective control modules, in which a license violation is determined unless every control module license ($sI_{By}$, $sI_{Py}$, $sI_{My}$) being used is included in the verification data set.

Specifically, in one refinement of this method variant, in accordance with the determination of a license violation described above, each control module license ($sI_{By}$, $sI_{Py}$, $sI_{My}$) used of the license data set comprises at least two parameters: a respective control module type (B, P, M) and a first number of control module licenses ($y_{sIB}$, $y_{sIP}$, $y_{sIM}$) assigned to the respective control module type (B, P, M), and each existing control module license ($SL_{Bx}$, $SL_{Px}$, $SL_{Mx}$) of the verification data set comprises at least two parameters: a respective control module type (B, P, M) and a second number of control module licenses ($x_{SLB}$, $x_{SLP}$, $x_{SLM}$) assigned to the respective control module type (B, P, M), and at least one control module license value ($z_{SL1}$, $z_{SL2}$, . . . , $z_{SLn}$) of respectively mutually assigned control module indicators (B, P, M) is determined in order to determine a license violation in that the first number of control module licenses ($y_{sIB}$, $y_{sIP}$, $y_{sIM}$) of the control module licenses ($sI_{By}$, $sI_{Py}$, $sI_{my}$) used is subtracted from the second number of control module licenses ($x_{SLB}$, $x_{SLP}$, $x_{SLM}$) of the existing control module licenses ($SL_{Bx}$, $SL_{Px}$, $SL_{Mx}$), and in which a license violation is determined if one of the determined control module license values ($z_{SL1}$, $z_{SL2}$, . . . , $z_{SLn}$) is <0, with the respective variables y=0, 1, . . . , n and z=−n, −1, . . . , 0, 1, n.

Finally, according to an advantageous embodiment of the verification method according to the invention, at least one stored system function can be selected manually by a user via a user interface. It is advantageous here if, before the system functions used are detected, a check is first made to determine whether the hardware components and/or input or output channels required for the at least one selected system function are available.

Optionally, information determined in the verification method can be retrieved by a user; this information includes, e.g., the system functions used by the oxygen reduction system, the existing licenses and control licenses contained in the verification data set, the licenses and control licenses used by the system functions used and contained in the license data set, the respective license or control license type thereof, the respective number of licenses or number of control licenses thereof, the assigned origin indicator, the determined license values, output messages, in particular error messages and fault messages, as well as deactivated system functions, time values of the timer, etc.

The object of the invention set out at the beginning is also achieved by means of a programmable control module for an oxygen reduction system, in which the oxygen reduction system is formed for lowering and/or maintaining an oxygen concentration level in at least one protection region by supplying inert gas originating from at least one inert gas source, in particular inert gas generated by means of at least one inert gas generator, and for monitoring or increasing the, in particular previously lowered, oxygen concentration level in the protection region or a monitoring region, and configured to carry out a verification method according to one of the variants described above, with one or more signal input channels and one or more signal output channels and with at least one interface for the transmission of data and/or for connection to a storage medium.

According to an advantageous embodiment of the programmable memory module, the number of signal input channels and/or signal output channels can be expanded by adding hardware components.

Providing additional space for expansion with optional assemblies and/or plug-in cards enables a modular and as-needed adaptation of the control module to the system functions used and the variably composed license and verification data sets used in the verification method according to the invention.

Finally, the object of the invention is also achieved by means of an oxygen reduction system with at least one programmable control module according to one of the embodiments described above and suitable for carrying out a verification method according to one of the method variants described above, in which one or more signal input channels of the at least one control module are connected to sensors of the oxygen reduction system and one or more signal output channels are connected to actuators of the oxygen reduction system.

BRIEF DESCRIPTION OF THE SEVERAL VIEWS OF THE DRAWINGS

Further details, features, (sub) combinations of features, advantages, and effects of the invention will be apparent from the following description of a preferred exemplary embodiment of the invention and from the set of drawings. The following is shown:

FIG. 5 shows a schematic representation of an exemplary embodiment of the assignment implemented in a control module, in which assignment the licenses used are assigned to existing licenses.

FIG. 6 shows a schematic representation of an exemplary embodiment of a global license data set.

FIG. 7 shows a schematic representation of an exemplary embodiment of the assignment implemented in a control module, in which assignment the control licenses used are assigned to existing control licenses.

FIG. 8 shows a first exemplary representation of information displayed on a user interface; and FIG. 9 shows a second exemplary representation of information displayed on a user interface.

The figures are merely exemplary in nature and are only used for understanding the invention. Equivalent elements are provided with the same reference numerals and are usually only described once.

DETAILED DESCRIPTION OF THE INVENTION

Figure 1:
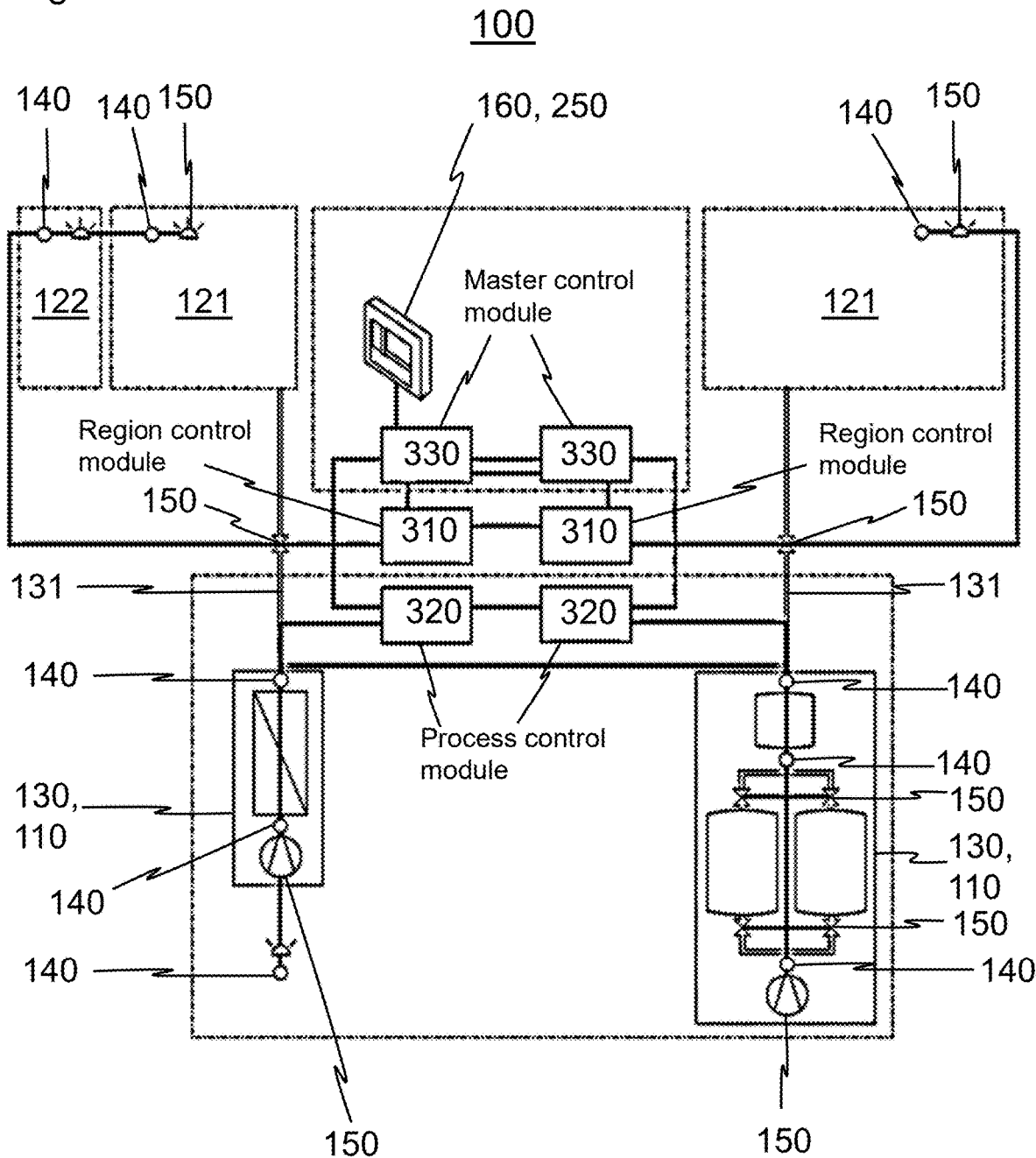
FIG. 1 shows a schematic representation of an oxygen reduction system with a decentralized control and regulation system.

FIG. 1 shows an exemplary embodiment of an oxygen reduction system 100 according to the invention, which is equipped with a decentralized control and regulation system. The oxygen reduction system 100 comprises two inert gas sources designed as inert gas generators 130, which inert gas sources are connected to two protection regions 121 via line connections conducting inert gas 131. A monitoring region 122 is arranged adjacent one of the protection regions 121. The inert gas generators 130 are each assigned a process control module 320 configured to control and regulate the corresponding inert gas generator 130, with the signal input channels 301, not shown here, of the process control module being connected to sensors 140, in particular pressure and oxygen concentration sensors, and the signal output channels 302, also not shown here, of the process control module 320 being connected to actuators 150, in particular valves and compressors of the inert gas generator 130. In a corresponding manner, a region control module 310 configured for lowering and/or maintaining as well as for monitoring or increasing a possibly previously lowered oxygen concentration level within the corresponding protection region 121 is also assigned to the protection regions 121. A monitoring region 122 is also assigned to one of the region control modules 310. The signal input channels 301, not shown here, of the region control modules 310 are connected to sensors 140, in particular oxygen concentration sensors, which are arranged within the respectively assigned protection regions 121 or within the monitoring region 122. The signal output channels 302, which are likewise not shown here, are correspondingly connected to actuators 150, in particular to section valves and/or alarm means, which are arranged within the respectively assigned protection regions 121 or within the monitoring region 122.

The region control modules 310 and the process control modules 320 do not communicate with one another directly, but are instead connected, in a signal-conducting manner, to two redundant master controllers 330, preferably via a bus or ring bus system. The region control modules 310, the process control modules 320, and the master control modules 330 are each configured to carry out the verification method 200 according to the invention, in which detection 201 of the system functions 110 used locally is implemented particularly on the region controllers 310 and the process controllers 320 and reading of a verification data set 220 is implemented on the master controllers 330. A user interface 250 for displaying the information ascertained in the verification method 200 can also be displayed via a control and display panel 160 that is signal-connected to one of the master control modules 330.

Figure 2:
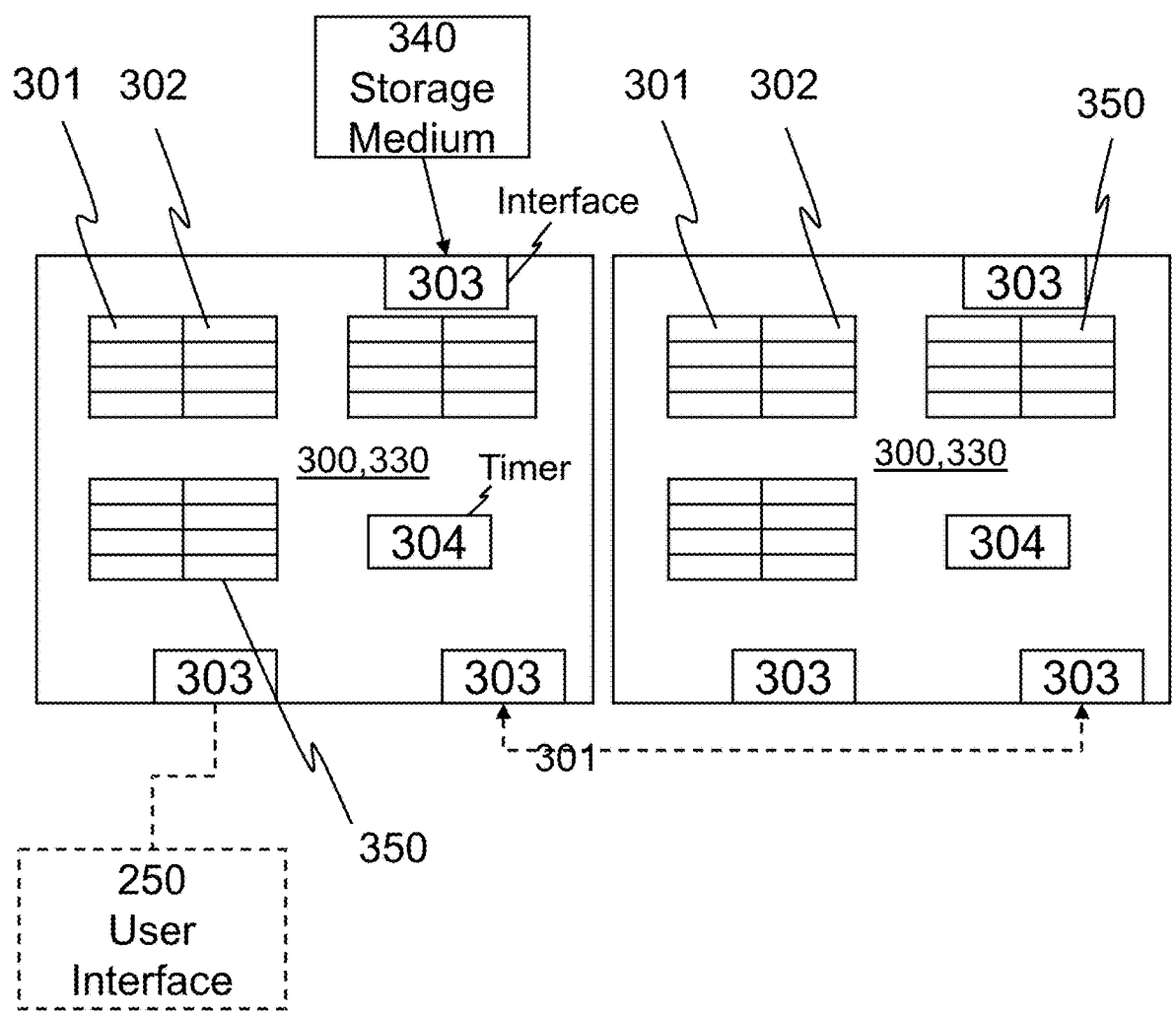
FIG. 2 shows a schematic representation of an exemplary embodiment of two control modules according to the invention.

FIG. 2 shows a schematic representation of an exemplary embodiment of two control modules 300 according to the invention. The two control modules 300 are preferably each configured as master control modules 330, have an identical structure, and preferably form a redundancy to increase reliability. A control module 300 here comprises, for example, three hardware components 350, each of which has particularly four signal input channels 301 for connection to sensors 140 of the oxygen reduction system 100, and four signal output channels 302 for connection to actuators 150 of the oxygen reduction system 100. The number of hardware components 350 can, if necessary, be expanded in a modular manner. The system functions 110 used by the oxygen reduction system 100 can be recognized and detected on the basis of the assignment of the signal input channels 301 and/or the signal output channels 302. The control module 300 further comprises a timer 304 and, e.g., three interfaces 303, in which one of the interfaces 303 is signal-connected to an external storage medium 340. A second interface 303 can be provided for the signal-conducting connection to an input and output device, for example, a computer or laptop, with a corresponding user interface 250. Finally, a third interface 303 is provided for the signal-conducting connection to a bus system, in particular a ring bus system, or to another network. In the figure shown here, a signal-conducting connection between the interface 303 and the redundant control module 300 is shown as an example.

A block diagram to schematically illustrate an exemplary method sequence of the verification method 200 according to the invention can be seen in FIG. 3 and is explained in more detail below with reference to FIG. 4, which illustrates an exemplary arrangement of several control modules 300 for an oxygen reduction system 100. The verification method 200 is preferably carried out during operation of the oxygen reduction system 100, i.e., while one or more system functions 110 are being used by the oxygen reduction system 100. According to FIG. 4, the verification method 200 is implemented on, e.g., six mutually signal-connected, programmable control modules 300, in which one of the control modules 300 is configured as a master control module 330, three further control modules 300 are configured as region control modules 310, and the remaining two control modules 300 are configured as process control modules 320. The region control modules 310 are configured to control and/or regulate system functions 110 to be carried out locally in an assigned protection or monitoring region 121, 122, and the process control modules 320 are configured accordingly to control and/or regulate the system functions 110 of respectively assigned inert gas sources, which in this example is an inert gas generator 130. The master control module 330 can also be configured to control and/or regulate locally used system functions 110.

Returning to FIG. 3, the system functions 110 used by the oxygen reduction system 100 are detected in a first method step 201. The detection 201 of the system functions 100 is expediently implemented on each of the control modules 300, 310, 320, 330, so that the system functions 110 respectively used therein are detected locally based on the individual input and output channel assignment of the respective control module 300, 310, 320, 330.

In a second method step 202, a license data set 210 is generated on the basis of the detected system functions 110. The second method step 202 is preferably also implemented locally on each control module 300, 310, 320, 330, so that an individual license data set 210 can be generated locally on each control module 300, 310, 320, 330. To this end, the system functions 110 are first of all differentiated into system functions 111 requiring a license and license-free system functions 112. In principle, a license $I_{ny}$, the license type n of which corresponds to the system function 111 (e.g. n=9: air circulation), said license being used for each system function 111 requiring a license, and the first number of licenses y of which corresponds to the number of licenses (e.g. y=1) used for the system function 111, are stored in the license data set 210. The air circulation is also a so-called optional system function 114 which, unlike the so-called basic system functions 113, is not absolutely necessary for the operation of the oxygen reduction system 100. Appropriately, a single license $I_{ny}$ used for several basic system functions 113 and a basic license, the license type n of which corresponds to the basic system functions 113 (e.g. n=6: region control module (standard functions) or n=22: process control module (standard functions)), can be stored in the license data set 210.

Figure 4:
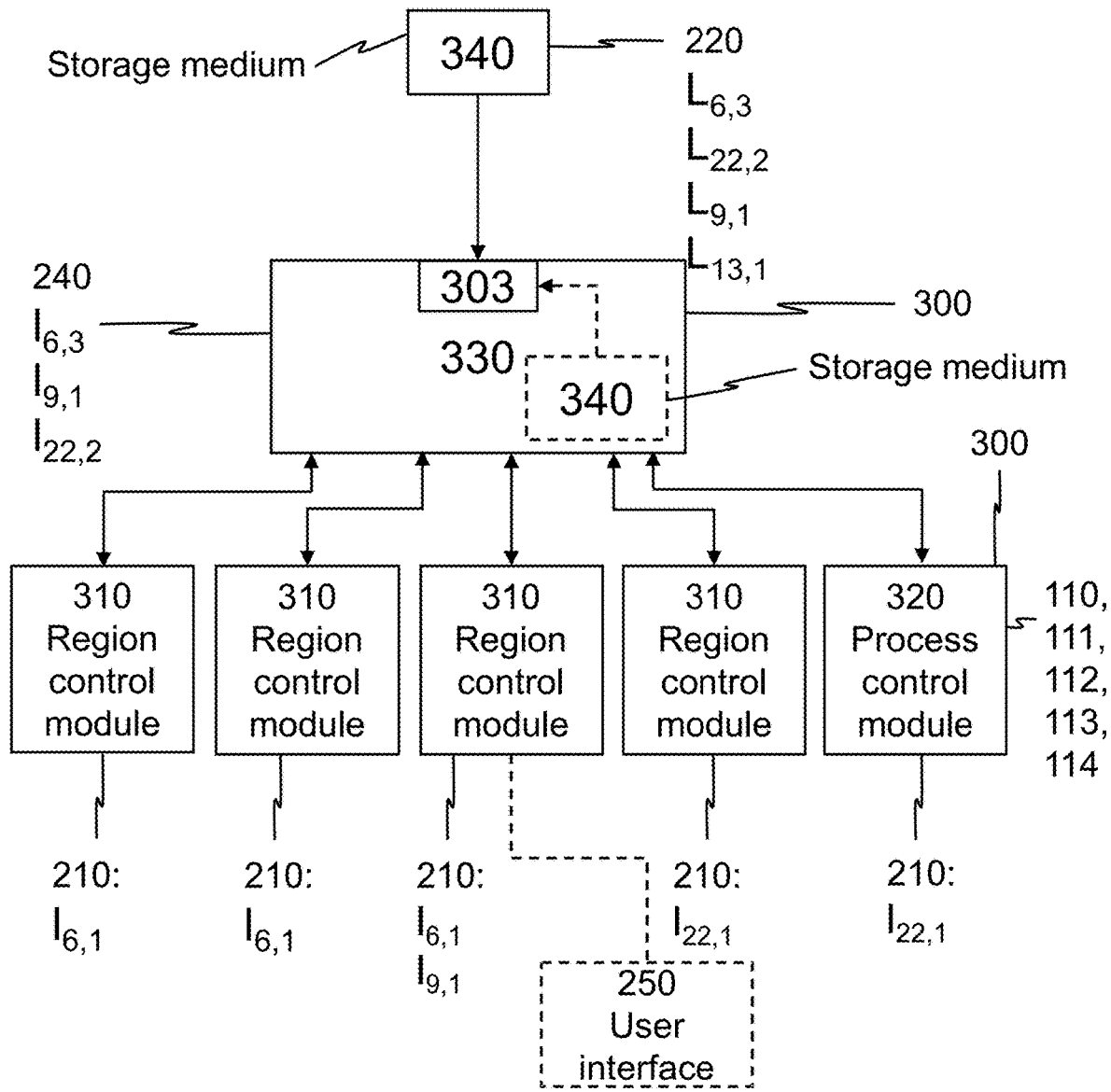
FIG. 4 shows a schematic representation of an exemplary embodiment of the invention in which several programmable control modules are connected to one another in a signal-conducting manner.

In the present exemplary embodiment according to FIG. 4, if more than one license data set 210 is generated locally, the locally generated license data sets 210 are combined into a single, global license data set 240 (see also FIG. 6). This method step is expediently implemented on the master control module 330. The global license data set 240 comprises the respective sum of the total licenses ($I_{1y}, I_{2y}, \ldots, I_{ny}$) used of the respective license type n and the local number of licenses y assigned to the corresponding control module 310, 320, 330. To this end, the respective licenses ($I_{1my}, I_{2my} \ldots, I_{nmy}$) used are provided with an additional origin indicator m (see also FIG. 6). The global license data set 240 accordingly contains a license $I_{6,3}$ used of the region control module (standard functions) license type and with the first number of licenses y=3, a license $I_{22,2}$ used from the process control module (standard functions) license type and with the first number of licenses y=2, as well as a license $I_{9,1}$ used of the air circulation license type and with the first number of licenses y=1. In addition, information is included regarding which control module 300, 310, 320, 330 is using the respective licenses.

Figure 3:
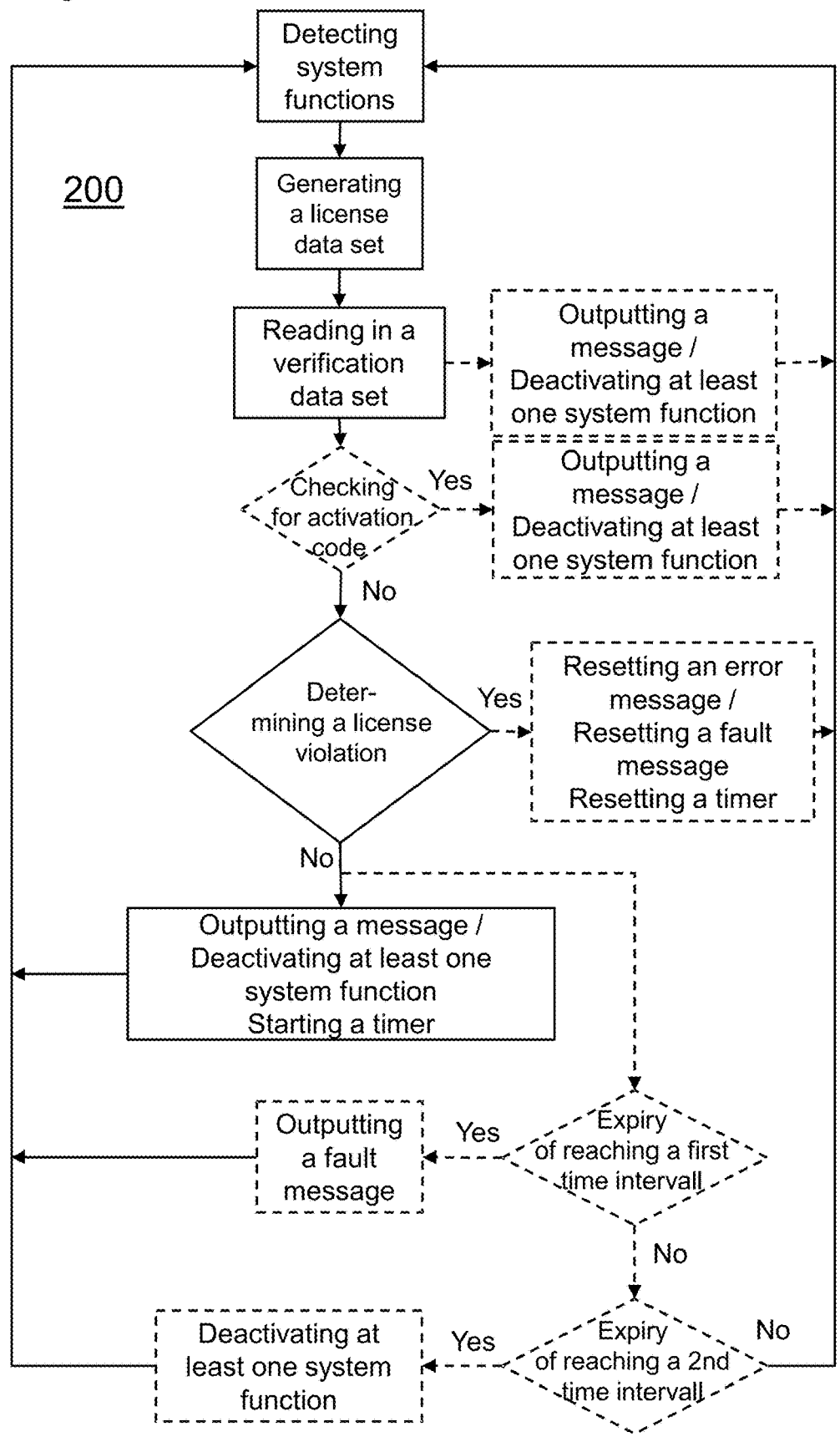
FIG. 3 shows a block diagram for schematically illustrating an exemplary sequence of the verification method according to the invention.

According to FIGS. 3 and 4, in a third method step 203, a verification data set 220 which is provided on a storage medium 340 and which contains a number of existing licenses ($L_{1x}, L_{2x} \ldots L_{nx}$) is read, and a license violation is determined in a fourth method step 204 if not every license ($I_{1y}, I_{2y}, \ldots, I_{ny}$) used of the license data set 210 (license type n and respective number of licenses y) or, according to the present exemplary embodiment, of the global license data set 240 is comprised of the licenses $I_{6,3}, I_{22,2}, I_{9,1}$ used by the verification data set 220. For example, in the case of a verification data set 220 that only contains the existing licenses $L_{6,3}, L_{22,2}$ or only the existing licenses $L_{6,2}, L_{22,2}, L_{9,1}$, a license violation would be found in each case.

Depending on the method variant, if there is a license violation in a fifth method step 205, 206, either a message, in particular an error message, can be output 205 or the license violation results in a deactivation 206 of at least one system function, in particular an optional and/or licensed system function 111, 114, or alternatively all of the system functions 110, 111, 112, 113, 114. According to the exemplary embodiment, if the verification data set 220 contains at least the existing licenses $L_{6,3}, L_{22,2}, L_{9,1}$, a license violation is not determined and the verification method 200 is repeated beginning with the first method step 201. The verification data set 220 can expediently also contain other existing licenses L, as shown here, for example, an existing license $L_{13.1}$ of the license type n=13: monitoring access doors with the second number of licenses x=1, which allow a user or the service personnel to use additional system functions 110, which are included, for example, in the intended scope of the license and the use thereof should therefore not lead to the determination of a license violation.

Even after a message, in particular an error message or a fault message, has been output 205, the verification method 200 according to the invention is carried out repeatedly. Regardless of the determination of a license violation, the operation of the oxygen reduction system 100 will (initially) continue. The verification method 200 according to the invention is preferably repeated at regular time intervals, in which merely deactivating 206 all system functions 110, 111, 112, 113, 114 also leads to an end of the verification method 200 according to the invention. In order to resume operation of the oxygen reduction system 100 and to continue to carry out the verification method 200, a manual restart of the oxygen reduction system 100 and possibly also of the verification method 200 is necessary.

According to a variant of the method, in an optional method step 208, a timer 304 can be started upon detection 204 of a license violation, which timer measures the elapsed time interval between the first detection 204 of a license violation until a license violation check is negative for the first time in a subsequent method cycle, i.e., the license violation is no longer present. According to a further variant of the method, an error message is output 209 after expiry, i.e., if the timer 304 measures backwards starting from a first predetermined time interval (e.g., 60 minutes) or when the first predetermined time interval has been reached, i.e., if the timer measures forwards starting from a time value zero, in which time interval an error message is output continuously 205. After expiry or when a second time interval has been reached (for example 72 hours) in which the fault message is output without interruption, all system functions can then preferably be deactivated 206 and the verification method 200 terminated.

If it is determined at a point in time of the verification method 200 that there is no license violation and if an error message and/or fault message is issued 205, 209, the error message and/or fault message can be reset in an optional method step 205a, 209a before a subsequent run of the verification method 200 is started. Correspondingly, the timer 304 can be reset in an optional method step 208a if it is determined 204 at a point in time of the verification method 200 that there is no license violation and the timer 304 has been started to detect a time interval or outputs a time value other than zero.

In an optional method step 207, to increase security, there can also be a check to determine whether the verification data set 220 contains an activation code, in which a message, in particular a fault message, is output 209 and/or at least one system function 110 is deactivated 206 if the activation code is not recognized. Method step 207 is preferably carried out after the third method step 203 but can also be carried out before or at the same time.

The verification data set 210 is read 203 preferably via an interface 303 connected or connectable to the storage medium 340 in a signal-transmitting manner. Finally, provision can optionally also be made for a message, in particular a fault message, to be output 209 and/or at least one system function 110 to be deactivated if the signal-transmitting connection between the storage medium 340 and the interface 303 is not detected.

FIG. 5 shows a matrix-like, i.e. in columns and rows, assignment 230 of the licenses ($I_{1y}, I_{2y}, \ldots, I_{ny}$) used, which are contained in the license data set 210, to the existing licenses ($L_{1x}, L_{2x} \ldots L_{nx}$) contained in the verification data set 220. The licenses ($I_{1y}, I_{2y}, \ldots, I_{ny}$) used are listed here as an example in column one, and the existing licenses ($L_{1x}, L_{2x} \ldots L_{nx}$) are in column three. Each row corresponds to a specific license type n, so that licenses of the same license type n are assigned to one another in rows. In the second or middle column, the license value z formed from the difference in the respective number of licenses Xin-yin is listed in rows. If one of the license values formed is z<0, a license violation is determined.

A schematic representation of an exemplary global license data set 240 is shown in FIG. 6. The sum of all numbers of licenses $y_{lnm}$ assigned to a respective license type n is formed in the first column. The other columns contain, broken down according to different control modules 300, the locally used licenses $I_{nmy}$, in which an origin indicator m is additionally assigned to each license $I_{nmy}$ used in the global license data set 240 so that licenses $I_{nmy}$ used by the same control module 300 are assigned to each other in columns and licenses $I_{nmy}$ of the same license type n are assigned to each other in rows.

According to FIG. 5, FIG. 7 shows a table-like and/or matrix-like assignment 230, i.e. in columns and rows, of the control module licenses ($sI_{By}, sI_{Py}, sI_{My}$) contained in license data set 210 to the existing control module licenses ($SL_{Bx}, SL_{Px}, SL_{Mx}$) contained in license data set 220. Instead of the license type n, the control module licenses ($sI_{By}, sI_{Py}, sI_{My}$) used and the existing control module licenses ($SL_{Bx}, SL_{Px}, SL_{Mx}$) are each provided with a parameter to identify the control module type, in which "B" is a region control module 310, "P" denotes a process control module 320, and "M" denotes a master control module 330. In the middle column, three control module license values $z_{SL}$ are formed which reflect the difference between the control module licenses ($sI_{By}, sI_{Py}, sI_{My}$) used and the existing control module licenses ($SL_{Bx}, SL_{Px}, SL_{Mx}$). A license violation is determined if one of the control module license values $z_{SL}$ is <0.

FIGS. 8 and 9 show an assignment 230 in columns and rows, as shown in general form in FIG. 5, using the exemplary embodiment according to FIG. 3 that was already used previously. The license types n=6, 9, 13, 22 stored for the verification method 200 are listed in the first column of the table. Column two shows how the real names of the system functions 110 assigned to the respective license types n can be displayed to a user or the operating personnel of the oxygen reduction system 100, by means of a user interface 250: n=6: region control module (standard functions), n=9: air circulation, n=13: monitoring of access doors, and n=22: process control module (standard functions). The respective first number of licenses y of the licenses I used is then stored in column three and can be displayed to the user as a specific value. The respective second number of licenses x of the existing licenses L is stored in column five and is likewise output as a specific value on the user interface 250 to a user or the service personnel. The difference formed from the first number of licenses y of the licenses I used and the second number of licenses x of the existing licenses L is stored as a license value z and informs the user or the service personnel, via the user interface 250, about the number of currently available licenses. According to the exemplary embodiment, all of the licenses L present in the verification data set 220 are being used, with the exception of one license for monitoring the access doors. The license for monitoring the access doors is freely available and could be used to carry out a corresponding system function 110 in that the user manually selects the corresponding system function 110 stored on a control module 300.

The table shown in FIG. 9 contains essentially identical information but represents a later point in time during the operation of the oxygen reduction system 100. In addition to the previously used system functions 110, the air circulation system function 110 was selected by a user or the service personnel on a control module 300. In column 3, the value of the first number of licenses y, which reflects the number of air circulation licenses used, has increased accordingly by 1; two air circulation licenses are being used. According to the exemplary embodiment, the same verification data set 220 is also available at this point in time, which is why a corresponding license value of −1 results with regard to the air circulation system function 110. In the verification method 200, a license violation is determined 204 and a message is output 205 accordingly. On the basis of the information displayed on the user interface 250, the user can identify the system function 110 that caused the license violation and, if necessary, correct it.

LIST OF REFERENCE NUMERALS

- 100 Oxygen reduction system
- 110 System functions
- 111 System functions requiring a license
- 112 License-free system functions
- 113 Basic system functions
- 114 Optional system functions
- 121 Protection region
- 122 Monitoring region
- 130 Inert gas source, particularly inert gas generator
- 131 Inert gas
- 140 Sensor
- 150 Actuator
- 160 Control and display panel
- 200 Verification method
- 201 Detecting system functions, first method step
- 202 Generating a license data set, second method step
- 203 Reading in a verification data set, third method step
- 204 Determining a license violation, fourth method step
- 205 Outputting a message, in particular an error message, fifth method step
- 205*a* Resetting an error message
- 206 Deactivating at least one system function, fifth method step
- 207 Checking for activation code
- 208 Starting a timer
- 208*a* Resetting a timer
- 208*b* Expiry of or reaching a first time interval
- 208*c* Expiry of or reaching a second time interval
- 209 Outputting a fault message
- 209*a* Resetting a fault message
- 210 License data set
- 220 Verification data set
- 230 Assignment
- 240 Global license data set
- 250 User interface
- 300 Programmable control module
- 301 Signal input channel
- 302 Signal output channel
- 303 Interface
- 304 Timer
- 310 Region control module
- 320 Process control module
- 330 Master control module
- 340 Storage medium
- 350 Hardware component
- I Licenses used ($I_{1y}, I_{2y}, \ldots, I_{ny}$)
- L Existing licenses ($L_{1x}, L_{2x} \ldots L_{nx}$)
- sI Control module licenses used ($sI_{By}, sI_{Py}, sI_{My}$)
- SL Existing control module licenses ($SL_{Bx}, SL_{Px}, SL_{Mx}$)
- n License type
- m Origin indicator
- x Second number of licenses (x=0, 1, n)
- y First number of licenses (y=0, 1, n)
- z License value (z=−n, −1, 0, 1, n)
- $x_{SL}$ Second number of control module licenses (x=0, 1, n)
- $y_{sI}$ First number of control module licenses (y=0, 1, ..., n)
- $z_{SL}$ Control module license value ($z_{SL1}, z_{SL2}, \ldots, z_{SLn}$)

The invention claimed is:

1. A verification method (200) for verifying system functions (110, 111, 112, 113, 114) of an oxygen reduction system (100), said functions being used during the operation of the oxygen reduction system (100), wherein the oxygen reduction system (100) reduces or maintains an oxygen concentration level in at least one protection region (121) by supplying inert gas (131) originating from at least one inert gas source (130) and to monitor or increase the oxygen concentration level in the at least one protection region (121) or in a monitoring region (122), which has the following method steps:

detecting (201) system functions (110, 111, 112, 113, 114) being used during the operation of the oxygen reduction system (100), generating (202) a license data set (210), wherein the license data set (210) contains licenses ($I_{1y}, I_{2y} \ldots, I_{ny}$) used by the system functions (110, 111, 112, 113, 114) being used, reading (203) a verification data set (220) provided on a storage medium (340), wherein the verification data set (220) contains at least one existing license ($L_{1x}, L_{2x} \ldots L_{nx}$), determining (204) a license violation if each license ($I_{1y}, I_{2y}, \ldots, I_{ny}$) used is not contained in the verification data set (220); and outputting (205) a message or deactivating (206) at least one system function (110, 111, 112, 113, 114) if a license violation is detected.

2. The verification method (200) according to claim 1, characterized in that the verification method (200) is implemented on at least one programmable control module (300, 310, 320, 330) and the system functions (110, 111, 112, 113, 114) used are detected based on a specific assignment of signal input and signal output channels (301, 302) of the at least one programmable control module (300, 310, 320, 330).

3. The verification method (200) according to claim 2, characterized in that each license ($I_{1y}, I_{2y}, \ldots, I_{ny}$) used of the license data set (210) comprises at least two parameters: a respective license type (1, 2, ..., n) and a first number of licenses ($y_{I1}, y_{I2}, \ldots y_{In}$) assigned to the respective license type (1, 2, ..., n), and each existing license ($L_{1x}, L_{2x} \ldots L_{nx}$) of the verification data set (220) comprises at least two parameters: a respective license type (1, 2, ..., n) and a second number of licenses ($x_{L1}, x_{L2}, \ldots x_{Ln}$) assigned to the respective license type (1, 2, ..., n) and, in order to determine (204) the license violation, the licenses ($I_{1y}$, $I_{2y}$, ..., $I_{ny}$) used are assigned to the existing licenses ($L_{1x}$, $L_{2x}$ ... $L_{nx}$) in a matrix (230).

4. The verification method (200) according to claim 3, characterized in that, in order to determine (204) the license violation, at least one license value ($z_1$, $z_2$, ..., $z_n$) is determined for mutually assigned license types (1, 2, ..., n) in that the first number of licenses ($y_{l1}$, $y_{l2}$, ... $y_{ln}$) of the licenses ($I_{1y}$, $I_{2y}$, ..., $I_{ny}$) used is subtracted from the second number of licenses ($x_{L1}$, $x_{L2}$, ... $x_{Ln}$) of the existing licenses ($L_{1x}$, $L_{2x}$ ... $L_{nx}$), and wherein a license violation is determined if one of the determined license values ($z_1$, $z_2$, ..., $z_n$) is <0.

5. The verification method (200) according to claim 1, characterized by checking (207) whether the verification data set (220) contains an activation code, wherein a message is output (205) or at least one system function (110, 111, 112, 113, 114) is deactivated (206) if the activation code is not recognized.

6. The verification method (200) according to claim 5, characterized in that the verification method (200) is repeated at specific or regular time intervals, and at the same time when the message (205) is output, a timer (304) is started (208) to detect the period of time during which the message is output (205).

7. The verification method (200) according to claim 6, characterized in that, upon reaching or after expiry of a predetermined period of time during which the message is output (205), a fault message is output (209) or at least one system function (110, 111, 112, 113, 114) of the oxygen reduction system (100) is deactivated (206).

8. The verification method (200) according to claim 6, characterized in that, upon reaching or after expiry of a predetermined period of time during which the message is output (205), at least one system function (110, 111, 112, 113, 114) of the oxygen reduction system (100) is deactivated (206).

9. The verification method (200) according to claim 1, characterized in that the verification data set is read in (203) via an interface (303) connected or connectable to the storage medium (340) in a signal-transmitting manner, wherein a message is output (205) or at least one system function (110, 111, 112, 113, 114) is deactivated (206) if the signal-transmitting connection between the storage medium (340) and the interface (303) is not detected.

10. The verification method (200) according to claim 1, characterized in that the verification method (200) is implemented on several programmable and signal-connected control modules (300, 310, 320, 330), wherein at least one of the several programmable and signal-connected control modules (300) is at least one region control module (310), which is assigned to at least one protection region (121) or monitoring region (122) and/or at least one of the several programmable and signal-connected control modules (300) is at least one process control module (320), which is assigned to at least one inert gas source (130) and/or at least one of the several programmable and signal-connected control modules (300) is at least one master control module (330).

11. The verification method (200) according to claim 10, characterized in that the detecting (201) of system functions (110, 111, 112, 113, 114) used is implemented on the at least one region control module (310) or the at least one process control module (320) or the at least one master control module (330), wherein system functions (110, 111, 112, 113, 114) locally assigned to the respective control module (310, 320, 330) are detected based on a specific assignment of signal input and signal output channels (301, 302) of the respective region control module (310) or process control module (320) or master control module (330).

12. The verification method (200) according to claim 11, characterized in that the reading (203) of the verification data set (220) is implemented on the at least one master control module (330).

13. The verification method (200) according to claim 12, characterized in that the verification data set (220) contains at least one existing control module license ($SL_{Bx}$, $SL_{Px}$, $SL_{Mx}$) and the license data set (210) contains control module licenses ($sI_{By}$, $sI_{Py}$, $sI_{My}$) used by the respective control modules (310, 320, 330), wherein the license violation is determined unless every control module license ($sI_{By}$, $sI_{Py}$, $sI_{My}$) used is included in the verification data set (220).

14. The verification method (200) according to claim 13, characterized in that each control module license ($sI_{By}$, $sI_{Py}$, $sI_{My}$) used of the license data set (210) comprises at least two parameters: a respective control module type (B, P, M) and a first number of control module licenses ($y_{sIB}$, $y_{sIP}$, $y_{sIM}$) assigned to the respective control module type (B, P, M), and each existing control module license ($SL_{Bx}$, $SL_{Px}$, $SL_{Mx}$) of the verification data set (220) comprises at least two parameters: a respective control module type (B, P, M) and a second number of control module licenses ($x_{SLB}$, $x_{SLP}$, $x_{SLM}$) assigned to the respective control module type (B, P, M), and at least one control module license value ($z_{SL1}$, $z_{SL2}$, ..., $z_{SLn}$) of respectively mutually assigned control module types (B, P, M) is determined in order to determine (204) the license violation in that the first number of control module licenses ($y_{sIB}$, $y_{sIP}$, $y_{sIM}$) of the control module licenses ($sI_{By}$, $sI_{Py}$, $sI_{my}$) used is subtracted from the second number of control module licenses ($x_{SLB}$, $x_{SLP}$, $x_{SLM}$) of the existing control module licenses ($SL_{Bx}$, $SL_{Px}$, $SL_{Mx}$), and wherein the license violation is determined if one of the determined control module license values ($z_{SL1}$, $z_{SL2}$, ..., $z_{SLn}$) is <0.

15. The verification method (200) according to claim 10, characterized by local generation (202) of at least one license data set (210) containing licenses ($I_{1y}$, $I_{2y}$, ..., $I_{ny}$) used by the respective control module (310, 320, 330), wherein each license ($I_{1y}$, $I_{2y}$, ..., $I_{ny}$) used therein is assigned to at least one locally used system function (110, 111, 112, 113, 114) and comprises at least two parameters: a respective license type (1, 2, ..., n) and a first number of licenses ($y_{l1}$, $y_{l2}$, ... $y_{ln}$) assigned to the respective license type (1, 2, ..., n).

16. The verification method (200) according to claim 15, characterized in that generating (202) a global license data set (240) is implemented on the at least one master control module (330), and the global license data set (240) is formed by combining the locally generated license data sets (210) in that the first number of licenses ($y_{l1}$, $y_{l2}$, ... $y_{ln}$) of the licenses ($I_{1y}, I_{2y}, \ldots, I_{ny}$) used locally by the respective control modules (310, 320, 330) are added to the mutually assigned license types (1, 2, ..., n) and wherein the licenses ($I_{11y}, I_{22y}, \ldots, I_{nmy}$) used locally by the respective control modules (310, 320, 330) are assigned an origin indicator (1, 2, ..., m) corresponding to the respective control module (310, 320, 330).

17. The verification method (200) according to claim 1, characterized in that at least one stored system function (110, 111, 112, 113, 114) can be selected manually by a user via a user interface (250).

* * * * *